United States Patent [19]

Mostow

[11] 4,058,714
[45] Nov. 15, 1977

[54] SELECTIVELY OPERATED, CLOCK-CONTROLLED REPETITIVE CALCULATOR

[76] Inventor: Arthur L. Mostow, 1184 Green Bay Road, Highland Park, Ill. 60035

[21] Appl. No.: 694,519

[22] Filed: June 10, 1976

[51] Int. Cl.² ........................... G06F 7/50; G06F 7/52
[52] U.S. Cl. .................................. 364/754; 364/761; 364/768
[58] Field of Search ............... 235/156, 152, 168, 159, 235/160, 164

[56] References Cited

U.S. PATENT DOCUMENTS

| | | | |
|---|---|---|---|
| 3,788,058 | 1/1974 | Idei et al. | 58/23 R |
| 3,860,806 | 1/1975 | Fichter et al. | 235/168 |

*Primary Examiner*—David H. Malzahn
*Attorney, Agent, or Firm*—Silverman & Cass, Ltd.

[57] ABSTRACT

A portable calculator which performs selected arithmetic computations including addition, subtraction, multiplication and division includes a selectively operative clock circuit. When activated, the clock circuit repetitively performs the preselected mathematical computation at predetermined intervals to obtain a total quantity that is a function of a specific time period.

8 Claims, 2 Drawing Figures

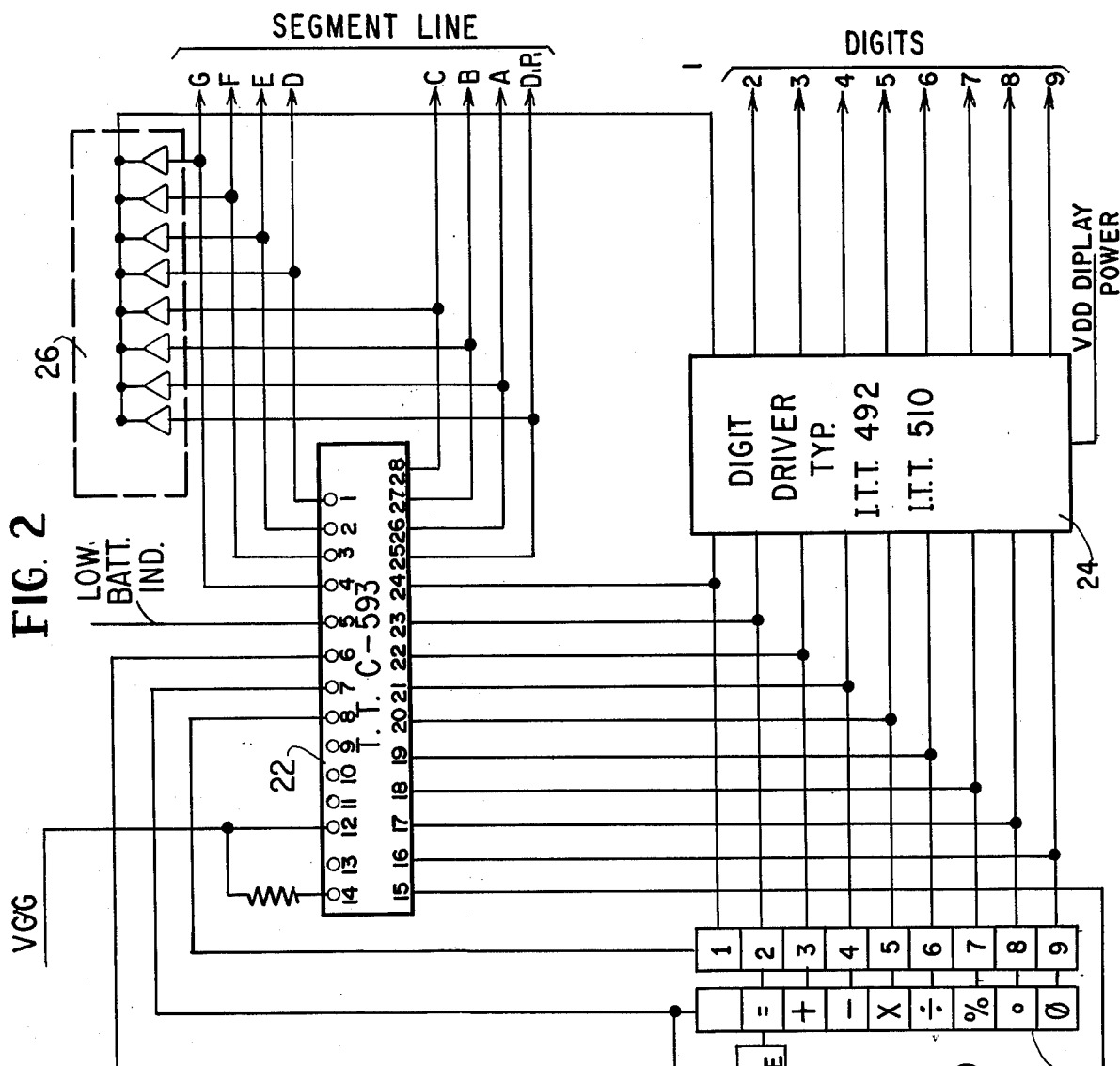
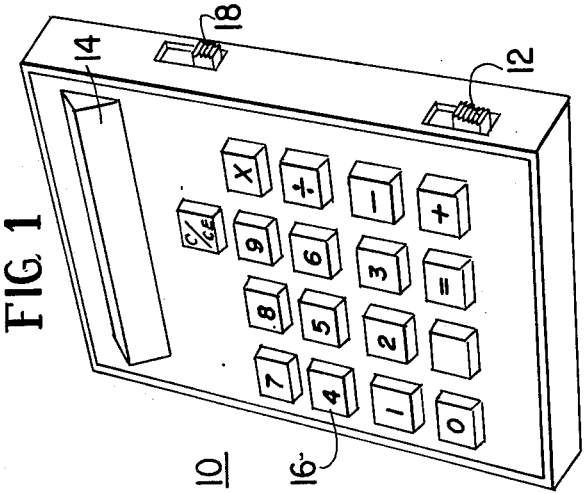
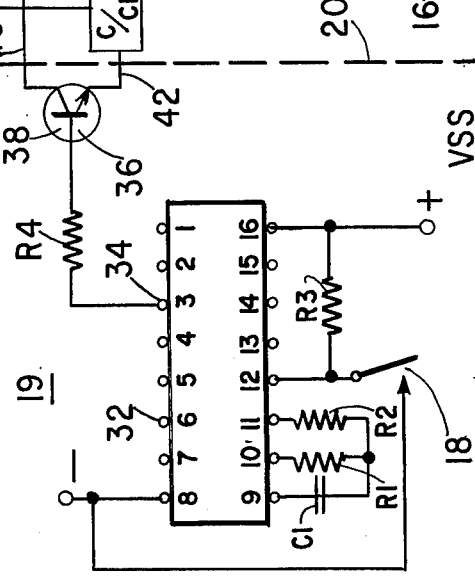

SELECTIVELY OPERATED, CLOCK-CONTROLLED REPETITIVE CALCULATOR

BACKGROUND OF THE INVENTION

This invention relates to calculators capable of repetitively performing selected mathematical computations, and more particularly, portable, pocket-type calculators for automatically performing selected mathematical computations repetitively and at predetermined intervals.

Calculators for performing the arithmatic computations of addition, subtraction, multiplication and division have become quite popular in all types of applications. With the advent of portable, battery-operated, pocket-type calculators, a substantial number of people have elected to perform arithmatic computations by use of such devices rather than manually. Even grade school children are employing portable, pocket-type calculators for performing their mathematical computations once they learn the fundamentals of mathematics.

In addition to being widely used by diverse segments of our society, such calculators are used for every conceivable computational function. Certain types of calculators can perform the basic arithmetic computations of addition, subtraction, multiplication or division repetitively. That is, the same number can be added to a base quantity repetitively in order to continuously accumulate a new total.

Certain types of activity require that a specified quantity be determined, generally by some type of arithmatic computation, and then that quantity must be added, subtracted, multiplied or divided by a specific time period in order to obtain a total quantity that is a function of the specified time period. One example of such a requirement would be in an automobile rally. In a rally, the average speed per second necessary to complete the course in the specified time is first determined, then that average speed is multiplied by the elapsed time in seconds to determine whether the participant is on time while driving the course.

Pocket type portable calculators have been employed to ascertain the average speed and then to multiply that average speed by the total number of seconds elapsed. However, determination of the elapsed time is done by reference to a stop watch or other such device so that the calculations are made at selected intervals rather than on a continuous basis. Additionally, the slight error in timing due to the necessity of transferring the time from the watch to the calculator can result in an error sufficient to cause loss of the race.

In business meetings with a number of people present it may be desirable to determine the cost of the meeting in terms of the salaries of the participants and the meeting elapsed time. This can be ascertained by first determining the cost per second of each participant's time, adding all of the costs per second together and multiplying this total by the total meeting elapsed time in seconds. Again, in the interest of maintaining costs and expenses at a minimum, it may be desirable and advantageous to be able to ascertain these costs on a second by second basis as the meeting progresses in order to facilitate termination of the meeting when the meeting expense becomes greater than the value of the meeting, or when the expense exceeds some predetermined amount.

SUMMARY OF THE INVENTION

In practicing this invention, there is provided a calculator adapted to perform selected mathematical computations such as, for example, addition, subtraction, multiplication and division, and to display the total produced by the selected mathematical computations. The calculator includes a clock circuit which can be selectively operated to repetitively perform any selected mathematical computation at predetermined time intervals allowing a display of the total obtained by repetitive performance of the mathematical computation for the specified time period.

BRIEF DESCRIPTION OF THE DRAWINGS

FIG. 1 is a perspective view of a portable calculator of the pocket type incorporating the features of this invention;

FIG. 2 is a block diagram of the major elements comprising the pocket calculator shown in FIG. 1.

DETAILED DESCRIPTION OF THE PREFERRED EMBODIMENT

Referring to FIG. 1, there is shown a portable calculator of the pocket type 10. Calculator 10 includes an on-off switch 12, a visual display section 14, and an entry keyboard 16. Switch 12 allows the unit to be turned on and off. Keyboard 16 includes keyboard switches for each digit from zero through 9, which when actuated, will enter the selected digit into the calculator storage area. The selected number will also be displayed at the visual display section 14. Keyboard switches are also included for selecting the desired arithmetic computation, addition, subtraction, multiplication and division being shown as available in calculator 10 of FIG. 1. To perform a desired calculation, for example addition, a keyboard switch, such as the switch displaying number two, is depressed on keyboard 16 causing the number two to be entered into the calculator storage. The number two will also be displayed at visual display section 14. The plus keyboard switch then is depressed to select the mathematical function of addition, and then the keyboard switch displaying a number two again is depressed to add the quantity two to the number two in storage. This second tow also is displayed at visual display section 14.

Next, the keyboard switch with an equal sign is depreseed causing the calculator to compute the quantity two plus two and display the total of four at visual display section 14. Because of the nature of the calculator, if it is desired to again add two to the total quantity, one simply depresses the keyboard switch with the equal sign again and a new total will be displayed in visual display section 14. This can be continued for as many additions as is desired.

At the end of the mathematical calculation, if it is desired to clear the calculator storage calculation section at display, one depresses the keyboard switch marked C/CE.

In the calculator shown in FIG. 1, an additional switch 18 is shown mounted to the side of the calculator housing. Switch 18 is a two-position switch causing a circuit to operate when in the "on" position and terminating operation of the circuit when in the "off" position. Switch 18 as shown in FIG. 2 is a part of a clock circuit 19 which includes a switch connected to entry keyboard 16, and which in the embodiment shown, is connected in parallel with the keyboard switch with the equal sign thereon. When switch 18 is moved to its "on" position, clock circuit 19 will be actuated and will close the switch therein every second. As long as switch 18 is in the "on" position, closure of the switch in the clock circuit will perform the same function as actuation of the keyboard switch 16 with the equal sign thereon. If, for example, two plus two had been added as discussed above, upon actuation of switch 18 the quantity two would be added to the total each second and the new total would be displayed in visual display section 14.

As previously noted, one use of such a device is to determine the cost of a meeting using only salary information. Further detailing the earlier example, assume that five persons are asked to attend a meeting with salaries as follows:

| Person | Annual Salary |
|---|---|
| 1 | $12,000 |
| 2 | 27,000 |
| 3 | 35,000 |
| 4 | 20,000 |
| 5 | 18,000 |

In calculating salaries per second, one first determines that there are approximately 7,500,000 seconds per working year based upon 260 working days at 8 hours per day. With that knowledge, one first turns on calculator 10 by operation of on-off switch 12, then adds the five noted salaries together to display a sum total of $112,000.00. This quantity is divided by 7,500,000 to ascertain total salary cost per second, arriving at a cost of $0.0149333/seconds which is displayed in visual display section 14. The cost per second is then stored and the addition function initiated by operation of the keyboard switch with the plus sign thereon. At the start of the meeting switch 18 is moved to its "on" position and calculator 10 will immediately begin to display cost per second of the meeting in visual display section 14 as follows:

| Time (seconds) | Cost (cumulative) |
|---|---|
| 1 | $0.0149333 |
| 2 | $0.0298666 |
| 3 | $0.0447999 |
| 60 | 0.895998 |
| etc. | etc. |

The repetitive calculations involving additon, subtraction, multiplication or division can be performed in the same fashion as noted in the example, such calculations being limited only by the circuitry available in calculator 10. The unique and primary feature herein being the ability to perform the desired calculation repetitively and at predetermined intervals in order to obtain a total that is a function of the desired time interval.

Referring now to FIG. 2, the circuitry present in a standard purchasable portable pocket type calculator is shown to the right of dashed line 20 and the clock circuit is shown to the left of dashed line 20. In the embodiment shown, the standard calculator is a Radio Shack model calculator, No. EC-275. The calculator includes the keyboard switches 16 previously noted which are wired to an integrated circuit 22. integrated circuit 22 is manufactured by Texas Instruments, Inc. under the part No. C-593 and performs all of the storage and calculation functions as well as selection of the appropriate segments of each digit in the visual display for illumination. Conductors from integrated circuit 22 to the segments of each digit are identified by the letters A through G and D.P.

A second integrated circuit 24 is also shown connected to keyboard 16. This circuit is used to actuate the appropriate digits in visual display section 14, allowing the appropriate segments therein to illuminate. Integrated circuit 24 is manufactured by International Telephone and Telegraph under part No. 492 or 510 and is commonly termed a "digit driver".

Visual display section 14 in this embodiment includes 9 separate digits which are connected to digit driver 24 by conductors identified with the numbers 1 through 9. Each digit consists of 8 separate segments, each segment being a light emitting diode (LED). One such digit is represented at 26 in FIG. 2. Seven of the eight diodes comprise the seven separate sections necessary to form any digit from zero through nine when selectively energized. The eight diode, when energized, provides a decimal point.

Passing to the left of dashed line 20, clock circuit 19 includes switch 18 which is connected to an integrated circuit 32. Integrated circuit 32 is manufactured by Radio Corporation of America under the part No. CD4060AE and includes two operational amplifiers and a digital divider. When connected as shown with appropriate values for resistors R1, R2, R3 and capacitor C1, integrated circuit 32 operates as an oscillator and develops a clock pulse of predetermined amplitude and duration at one second intervals at output 34. This pulse is coupled through resistor R4 to base electrode 36 of transistor switch 38. The collector electrode 40 and emitter electrode 42 of transistor switch 38 are connected across the equal keyboard switch in entry keyboard 16 as shown.

Upon receipt of each pulse from output 34 of integrated circuit oscillator 32, transistor switch 38 changes states and provide a conductive path between collector 40 and emitter 42, thus providing a short in parallel with the equal keyboard switch in keyboard 16 in the same fashion as if the equal keyboard switch had been operated. This shorting causes integrated circuit 22 to repeat the computational function selected. Because the pulses occur once each second, the calculation is repeated once each second and a new total will be displayed in visual display section 14 each second.

While the present invention has been described by reference to a specific example, it is to be understood that moifications may be made by those skilled in the art without actually departing from the invention shown and described herein. It is therefore intended that the appended claims cover all variations that fall within the scope and spirit of this invention.

What is desired to be secured by Letters Patent of the United States is:

1. A device for performing multiple repetitive mathematical calculations including in combination: a calculator including means to enter a desired number; storage means to store a number representing a total, means for displaying said number representing the total, means for combining said entered number with said number representing a total stored in said storage means to develop a new number representing a total, and a clock circuit coupled to said calculator and operative at predetermined intervals to operate said combining means, said clock circuit including an oscillator selectively operative to repetitively develop pulses at a predetermined repetition rate and switch means coupled to said oscillator and said combining means operative in response to each of said pulses to switch and operate said combining means to combine said entered number with said number representing a total to develop a new number representing a new total.

2. The device of claim 1 wherein said switch means is a solid state switch.

3. The device of claim 2 wherein said solid state switch is a transistor switch.

4. The device of claim 4 wherein said combining means includes a switch, said switch means being coupled to said switch.

5. The device of claim 4 wherein said switch and switch means are connected to be parallel.

6. The device of claim 5 wherein said switch means is a transistor having base, emitter and collector electrodes, said base electrode being coupled to said oscillator and said emitter and collector electrodes being coupled to said switch.

7. In a calculator including means to perform selected mathematical computations and display the quantity obtained by such performance, the improvement comprising; a clock circuit selectively operative to repetitively effect said performance by the performing means of said selected mathematical computations at predetermined time intervals and the display of a quantity obtained by such performance per specified time, said selected mathematical computations including addition, subtraction, multiplication, and division.

8. In a calculator having a keyboard through which selected quantities are entered and mathematical functions are selected, means for performing said mathematical functions, actuatable means for rendering the performing means operative to perform one of the selected functions and means for storing and displaying the entered quantities and computational results obtained by said performance of the performing means; the improvement including selectively operable clock means for generating timing pulses, and switch means connecting the clock means to the calculator in bypass relation to the actuatable means for rendering the performing means repetitively operative in response to said pulses to perform said selected functions with respect to a selected quantity initially entered, whereby the cumulative computational results corresponding to the repetitive operation of the performing means are displayed as a function of time.

* * * * *

UNITED STATES PATENT AND TRADEMARK OFFICE
CERTIFICATE OF CORRECTION

PATENT NO. : 4,058,714
DATED : November 15, 1977
INVENTOR(S) : ARTHUR L. MOSTOW

It is certified that error appears in the above-identified patent and that said Letters Patent are hereby corrected as shown below:

In column 2, line 48, change "depreseed" to --depressed--;
In column 3, line 44, insert dashes below the third line on each side of the chart;
In column 3, line 63, change "integrated" to --Integrated--;
In column 4, line 48, change "moifications" to --modifications--;
In column 5, line 9, dependency number should be changed from "4" to --1--.

Signed and Sealed this

Twenty-fourth Day of October 1978

[SEAL]

Attest:

RUTH C. MASON
Attesting Officer

DONALD W. BANNER
Commissioner of Patents and Trademarks